United States Patent [19]

Siller

[11] 4,321,938
[45] Mar. 30, 1982

[54] DOSING DEVICE
[75] Inventor: Rudi Siller, Abstatt, Fed. Rep. of Germany
[73] Assignee: Cillichemie Ernst Vogelman GmbH & Co., Heilbronn, Fed. Rep. of Germany
[21] Appl. No.: 165,182
[22] Filed: Jul. 1, 1980
[30] Foreign Application Priority Data
Jul. 7, 1979 [DE] Fed. Rep. of Germany ....... 2927617
[51] Int. Cl.³ ............................................ G05D 11/03
[52] U.S. Cl. ...................................... 137/99; 137/322; 137/587; 137/590; 251/149.3; 222/57; 222/325; 264/524; 220/366; 220/203
[58] Field of Search .................. 264/524; 137/99, 322, 137/572, 587, 590; 222/57, 325; 251/149.3; 220/206, 207, 203, 208, 366

[56] References Cited
U.S. PATENT DOCUMENTS

| 1,726,082 | 8/1929 | McLaughlin et al. | 137/99 |
| 2,038,833 | 4/1936 | Frank et al. | 251/149.3 |
| 2,148,671 | 2/1939 | Allen | 137/99 |
| 2,837,105 | 6/1958 | Henke | 137/99 |
| 3,138,279 | 6/1964 | Meissner | 264/524 |
| 3,549,048 | 12/1970 | Goodman | 137/99 |
| 3,945,366 | 3/1976 | Matthews | 220/206 |
| 4,135,647 | 1/1979 | Mascia et al. | 222/325 |
| 4,141,467 | 2/1979 | Augustijn et al. | 137/99 |
| 4,236,651 | 12/1980 | Meyer et al. | 222/325 |
| 4,257,440 | 3/1981 | Hunter | 137/99 |

Primary Examiner—H. Jay Spiegel
Attorney, Agent, or Firm—Toren, McGeady & Stanger

[57] ABSTRACT

In a device for dosing a liquid effective substance into flowing water, a housing forms a flow path for the water and contains a drive mechanism arranged to be driven by the water. A disposable tank unit is mounted on the housing and includes a dosing pump and an injection valve. The dosing pump is driven by the drive mechanism and withdraws the liquid effective substance from the tank and directs it into the injection valve for introduction into the water flowing through the housing.

12 Claims, 1 Drawing Figure

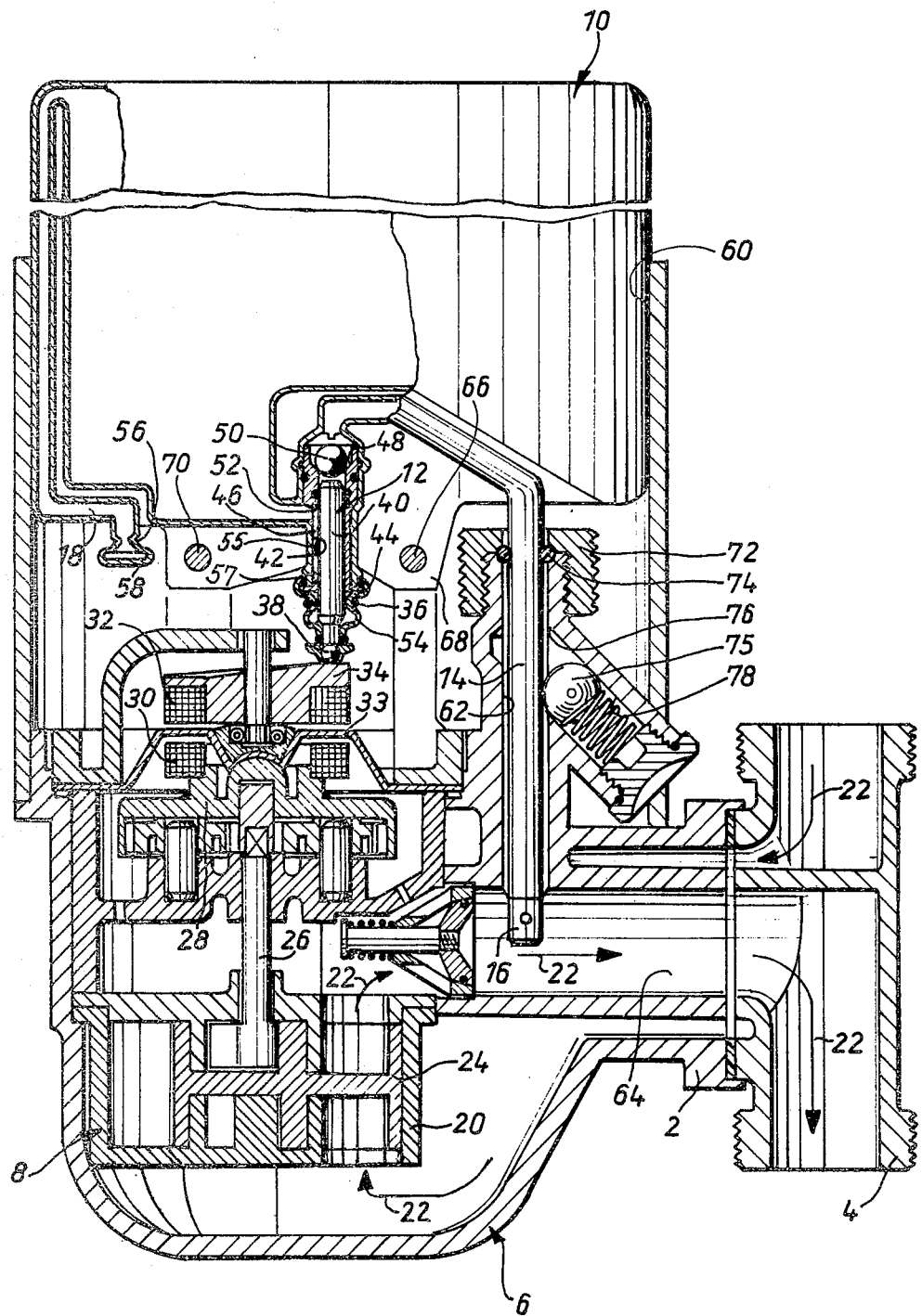

DOSING DEVICE

SUMMARY OF THE INVENTION

The present invention is directed to a dosing or metering device including a housing arranged to conduct water through a flow path with a drive mechanism located within the housing and arranged to be driven by the water. A tank for the liquid effective substance is mounted on the housing and includes a pump driven by the drive mechanism for withdrawing the substance from the tank and directing it into the flow path through the housing.

Dosing devices of this general type are known and include various water meters acting as the drive mechanism and with the dosing pump always being accommodated in the housing along with the drive mechanism. Frequently, the dosing device incorporates the injection nozzle or valve in the housing. The tank or container for the liquid effective substance, however, which is connected to the dosing pump, can be easily replaced.

In such devices, the concentrated solution of the effective substance is conveyed directly from the tank to the dosing pump and then through the injection valve and into the line containing the injection valve. These various components are particularly endangered by deposits which precipitate or crystallize out of the solution of the effective substance and cause a gradual clogging of the various openings required for operation. Such a situation is especially true when the device is idle for an extended period of time and when air enters the container holding the effective substance. The movable components within the dosing pump are also subjected to an increased wear because of such deposits. Therefore, to ensure reliable operation, frequent cleaning and maintenance of the components conducting the effective substance is required. In the past such operations could only be performed by trained maintenance personnel.

Therefore, the primary object of the present invention is to provide a dosing or metering device of the above type in which an untrained worker can replace the components subjected to the effected substance so that the device operates essentially without maintenance.

In accordance with the present invention, a dosing device is provided where the tank for the effective substance along with the dosing pump and the injection valve form a disposable unit which can be releasably mounted on the device housing and connected to the drive mechanism.

In accordance with the present invention, maintenance-free operation of the dosing device is ensured when the components directly subjected to the effective substance, such as the dosing pump and injection valve and their supply lines, are removed and disposed of along with the empty tank for the liquid effective substance. As a result of the incorporation of these components along with the tank into a disposable unit containing the liquid effective substance, the procedure for replacing the unit is especially simple so that even an untrained worker can perform the replacement procedure.

Advantageously, the liquid injection valve is arranged at the free end of a dosing pipe integrally connected to the tank containing the liquid effective substance and the valve can be inserted through a duct formed in the housing containing the drive mechanism leading into the water flow path in the housing. A valve body is provided in the dosing pipe for controlling flow through it.

In this dosing device, a piston pump is used as the dosing pump and includes a tappet biased by a compression spring against a cam disc on the drive mechanism in the housing and the tappet is connected to a piston guided within a cylinder formed as a part of the tank. A valve body is associated with the cylinder for controlling flow from the pump to the injection valve. An advantageous feature of the invention is the integration of the cylinder containing the piston and the valve body in the tank so that it communicates with the tank interior and with the injection valve through a dosing line. These various connections are formed as integral parts of the tank for the liquid effective substance. The piston tappet projects outwardly from an outlet opening in the tank and the opening is sealed by a bellows-type sleeve fastened to the rim of the outlet opening and to the tappet.

In the production of the tank for the effective substance, the pump is incorporated into the tank so that subsequently it is only necessary to fit the bellows-type sealing sleeve in position. Advantageously, the windings of the spring in the form of a helical spring, are connected to the bellows-type sleeve or, preferably, are embedded in the sleeve.

Advantageously, the tank containing the effective substance is ventilated through a pipe formed integrally with the tank and provided with a ventilating opening closed by a cap which can be twisted off at a predetermined breaking point. Before the tank is placed in use, the ventilating opening is kept closed and it is opened only at the time the tank is to be mounted on the housing and drive mechanism.

To afford a simple procedure for mounting the tank and its incorporated components on the housing drive mechanism, the housing has an upwardly facing, cup-like opening into which the bottom portion of the tank is fitted. Preferably, the piston tappet of the dosing pump, the injection valve and the ventilating opening are located at the bottom of the tank and face downwardly so that, when the tank is inserted into the cup-like opening, these various parts can be connected to the corresponding components of the housing drive mechanism.

A releasable connection can positively interlock the tank and the drive mechanism so that the connection between the tank and the housing are fixed in the operating position. This interlocking action is afforded by at least one rod which can be passed through openings in the housing and the tank with such openings extending transversely of the piston movement of the dosing pump and being in alignment with one another. In place of the rod an appropriate anchoring stirrup can be utilized.

In accordance with the invention, the tank for the liquid effective substance along with the pipe lines and chambers integrally formed with it, can be produced as a blow body. If the liquid effective substance is used in forming the blow body, the tank is filled at the same time that it is constructed. The prefabricated dosing pump can be embedded in the tank by placing it in the blow mold prior to the production procedure, so that subsequently it is only necessary to fit the bellows-type sealing sleeve on the tappet and, if necessary, a valve hose on the dosing pipe.

The various features of novelty which characterize the invention are pointed out with particularity in the claims annexed to and forming a part of this disclosure. For a better understanding of the invention, reference should be had to the accompanying drawing and descriptive matter in which there are illustrated and described preferred embodiments of the invention.

BRIEF DESCRIPTION OF THE DRAWING

The drawing is a sectional schematic view of a preferred embodiment of the present invention showing a vertical section through a dosing device.

DETAIL DESCRIPTION OF THE INVENTION

As shown in the drawing, the dosing device includes a housing 6 forming a water flow path and containing a drive mechanism located in the flow path. The housing 6 can be connected to a water pipe 4 through a special connection piece. A tank 10 containing the liquid effective substance is mounted in the housing and includes, as integral parts, a dosing pump 12, a dosing pipe 14 including an injection valve 16, and a ventilating pipe 18.

Drive mechanism 8 includes a hydraulic motor 20 constructed as a rotary-piston meter which is driven by the water flowing in the path through the housing 6 indicated by the directional arrows 22. Note that the water enters the housing, flows through the hydraulic motor 20 and then out to the water line 4. Hydraulic motor 20 includes a rotary piston 24 connected through a shaft 26 to a rotary disc 28 so that the rotary motion of the piston is transmitted to the disc. A magnetic power clutch provided by the annular permanent magnets 30, 32 connects the drive mechanism 8 to a cam disc 34 located outside the wall 33 of the housing 6. The upwardly directed face of cam disc 34 bears against the lower end face of a tappet 38 of the dosing pump 12. The dosing pump 12 is a piston pump. Tappet 38 projects downwardly below the lower portion of tank 10 containing the liquid effective substance and is biased downwardly by a helical spring 36 so that the tappet 38 connected to the piston 40 is moved through an upstroke and a downstroke once during each complete revolution of the cam disc 34. The dosing pump 12 includes a cylinder 46 for guiding the piston 40. Cylinder 46 is located within a chamber 42 integrally molded as a portion of the lower end of the tank 10. At its upper end, the cylinder 46 forms a valve seat 48 facing toward the dosing pipe 14 with the dosing pipe being connected to the upper end of the chamber 42. A valve ball is located at the upper end of the cylinder and can be fitted against the valve seat 48. Below the valve seat, a lateral inlet opening 52 is provided between the interior of the tank and the interior of the cylinder 46. A through opening 44 is provided at the bottom of the chamber 42 with the lower end of the piston 40 and the tappet 38 located outwardly of the through opening. Tank 10 is sealed against leakage of liquid from the through opening 44 by a bellows-type rubber sleeve 54 which includes the helical spring 36. Biased by the helical compression spring 36, the bellows-type sleeve bears at its upper end against the outer rim region of the through opening 44 while its other end bears against the tappet 38. By means of a cam 55, the piston is guided in a longitudinal recess formed in the cylinder 46 and is secured against falling out of the cylinder.

When the piston performs its downward stroke, the inlet opening is uncovered and a suction action draws a defined amount of the liquid effective substance from the tank 10 into the cylinder 46 within the dosing pump 12. The downward or suction stroke maintains the ball 50 in contact with the valve seat 48 closing off the upper end of the cylinder 46. At the completion of the downward stroke, the piston 40 reverses direction and commences its upward or pressure stroke causing ball 50 to be displaced upwardly off the valve seat 48 and, at the same time, displacing the amount of the effective substance drawn into the cylinder into the dosing pipe 14 so that, at the same time, a corresponding amount of the substance is discharged from the injection valve 16 located at the lower end of the dosing pipe 14 into the zone 64 of the water flow path through the housing 6. When the piston is again retracted or moves downwardly, the valve ball 50 moves into contact with the valve seat 48 and prevents any back-flow of the effective substance which is under pressure in the dosing pipe into the cylinder 46. Tank 10 containing the liquid effective substance is ventilated through a laterally positioned integrally connected ventilating tube 18 having a downwardly facing opening at its lower end closed by a cap 58. Though the cap 58 is shown in the drawing, under normal operating conditions the cap is twisted off at a predetermined breaking point 56 before dosing operations are commenced.

Housing 6 including driving mechanism 8 is fixed to the water line 4, while the tank 10 containing the liquid effective substance along with the dosing pump 12, the dosing pipe 14 and the ventilating pipe 18 form a replaceable integral unit which can be disposed of when all of the effective substance is used up. The tank 10 is inserted downwardly from the top of the housing 6 into a cup-like opening 60 so that the downwardly protruding dosing pipe 14 with the injection valve 16 slides downwardly through a vertically arranged duct 62 formed in the housing and open at its lower end into the zone 64 of the water flow path through the housing. During the assembling operation, the pump tappet 38, biased downwardly by the spring 36, contacts the upper surface of the cam disc 34. The tank along with its incorporated components is secured within the cup-like portion 60 by a locking stirrup 66 fitted into corresponding anchoring holes 70 located in a downward projection 68 on the tank and in the housing 6. With the tank secured on the housing, a cap screw 72 can be threaded on to the upper end of the duct 62 and forces a flexible sealing ring 74 into sealing engagement with the upper end of the duct 62 so that it is closed with the sealing ring being clamped between the inner surface of the duct and the outer surface of the dosing pipe 14.

When a tank 10 is emptied of the liquid effective substance it can be removed in the reverse sequence. Initially the stirrup 66 is pulled out of the anchoring holes 70, the cap screw 72 is loosened to the extent that the dosing pipe 14 can be pulled upwardly out of the duct 62 as the tank is removed from the cup-shape portion of the housing 6. In removing the tank 10, when the dosing pipe 14 is pulled upwardly out of the duct 62, a valve ball 75 located in a chamber 78 formed by a portion of the duct 62 and biased by a compression spring, is moved into contact with a valve seat 76 within the duct so that any water flowing from the path in the housing into the duct cannot flow out of its upper end. When a fresh tank of the liquid effective substance is installed in the housing, ball 75 is automatically pressed back into the chamber 78 by the dosing pipe as it moves downwardly through the duct 62 displacing the ball away from the valve seat 76. In this manner, it is possible to replace a tank 10 without shutting off the flow of water through the housing 6.

The tank 10 including the integrally arranged pipe lines 14, 18 and the chamber 42, is usually produced in a blowing method with the liquid effective substance acting as the pressure medium. Accordingly, the tank can be filled at the same time that it is formed. Prefabricated pump cylinder 46 containing the valve ball 50 and the piston 40 is embedded in the tank during the production procedure by placing it in the blow mold, so that, subsequently, it is only necessary to seal the through opening 44 from the bottom of the tank with the resilient bellows-type rubber sleeve 54 and to fit a rubber valve hose, not shown, on the injection valve end of the dosing pipe 14. Tank 10 produced in this manner forms a unit which can be thrown away after the liquid effective substance which it contains is used up, so that the normally required maintenance of the dosing pump and of the ejection valve are no longer required.

While specific embodiments of the invention have been shown and described in detail to illustrate the application of the inventive principles, it will be understood that the invention may be embodied otherwise without departing from such principles.

What is claimed is:

1. Device for dosing liquid effective substances in flowing water comprising a housing arranged to conduct water through a flow path therein, said housing being arranged for connection to a water line, a drive mechanism located in the water flow path in said housing and arranged to be driven by the water flowing therethrough, a dosing pump driven by said drive mechanism, a replaceable tank containing the liquid effective substance, an injection valve arranged to deliver the liquid effective substance to the water flowing through said housing, said dosing pump having a suction side connected to the interior of said tank and a pressure side connected to said injection valve, wherein the improvement comprises that said tank and said dosing pump form a disposable unit removable mountable on said housing and connectable with said driving mechanism said dosing pump comprises a piston pump including a cylinder, a piston guided in said cylinder, a tappet connected to said piston, and spring means for biasing said tappet into contact with said drive mechanism, said tank including a chamber separate from the interior of said tank and being in communication with the interior of said tank, said pump cylinder including said piston being located within said tank chamber, a valve body located at the opposite end of said cylinder from said tappet and providing a closure from said cylinder to said chamber, said chamber having an opening therethrough at the opposite end thereof from said valve body and opening to the exterior of said tank, said tappet extending from said opening to the exterior of said tank, and means forming a sealed closure between said through opening and said tappet.

2. Device, as set forth in claim 1, wherein said injection valve is an integral component of said disposable unit and is connectable to said housing.

3. Device, as set forth in claim 2, wherein said housing includes a duct connected to the water flow path therein and extending outwardly therefrom, a dosing pipe integrally formed with said tank and extending between said dosing pump and said injection valve, said dosing pipe being removably insertable into said duct in said housing, with said injection valve being located for introducing the liquid effective substance into the water flow path in said housing.

4. Device, as set forth in claim 3, wherein said duct includes a chamber therein extending laterally outwardly from said duct, a valve body mounted in said chamber and being biased from said chamber into said duct for providing a closure of said duct when said dosing pipe is withdrawn therefrom.

5. Device, as set forth in claim 1, 2, 3 or 4 wherein said tank includes a ventilating pipe formed integrally therewith with said ventilating pipe having one end open to the interior of said tank and a second end open to the exterior of said tank, and a cap forming a closure for the end of said ventilating pipe open to the exterior of said tank with said cap having a predetermined breaking point so that said cap can be twisted off and removed from said ventilating pipe.

6. Device, as set forth in claim 5, wherein said housing having an upwardly directed cup-like opening for receiving the bottom portion of said tank, and said tappet, said injection valve and said second open end of said ventilating pipe open to the exterior of said tank being located in the lower portion of said tank so that they extend downwardly within said cup-like opening below said tank.

7. Device, as set forth in claim 1, wherein said drive mechanism comprises a cam disc.

8. Device, as set forth in claim 1, wherein said sealing means comprises a bellows-type sleeve fastened at one end around said opening from said chamber to the exterior of said tank and at its other end to said tappet.

9. Device, as set forth in claim 8, wherein said spring being a helical compression spring having a plurality of turns, the turns at one end of said spring being connected to said sleeve for biasing said sleeve into sealing contact with said opening from said chamber.

10. Device, as set forth in claim 1, 2, 3 or 4, including means for releasably interlocking said tank in said housing and for fixing said dosing pump and said injection valve relative to the corresponding cooperative parts of said housing.

11. Device, as set forth in claim 10, wherein said tank and said housing having anchoring holes therein alignable with one another and extending transversely of the direction of the piston movement within said dosing pump, and said means for interlocking said tank and said housing comprising at least one locking rod removably insertable through said anchoring holes.

12. Device, as set forth in claim 1, 2, 3, or 4, wherein said tank comprises a blow body with the liquid effective substance forming the pressure medium for forming said blow body and at the same time filling said tank.

* * * * *